No. 826,442. PATENTED JULY 17, 1906.
H. P. ORR.
APPARATUS FOR FORMING ARTICLES OF PLASTIC MATERIAL.
APPLICATION FILED MAR. 28, 1905.
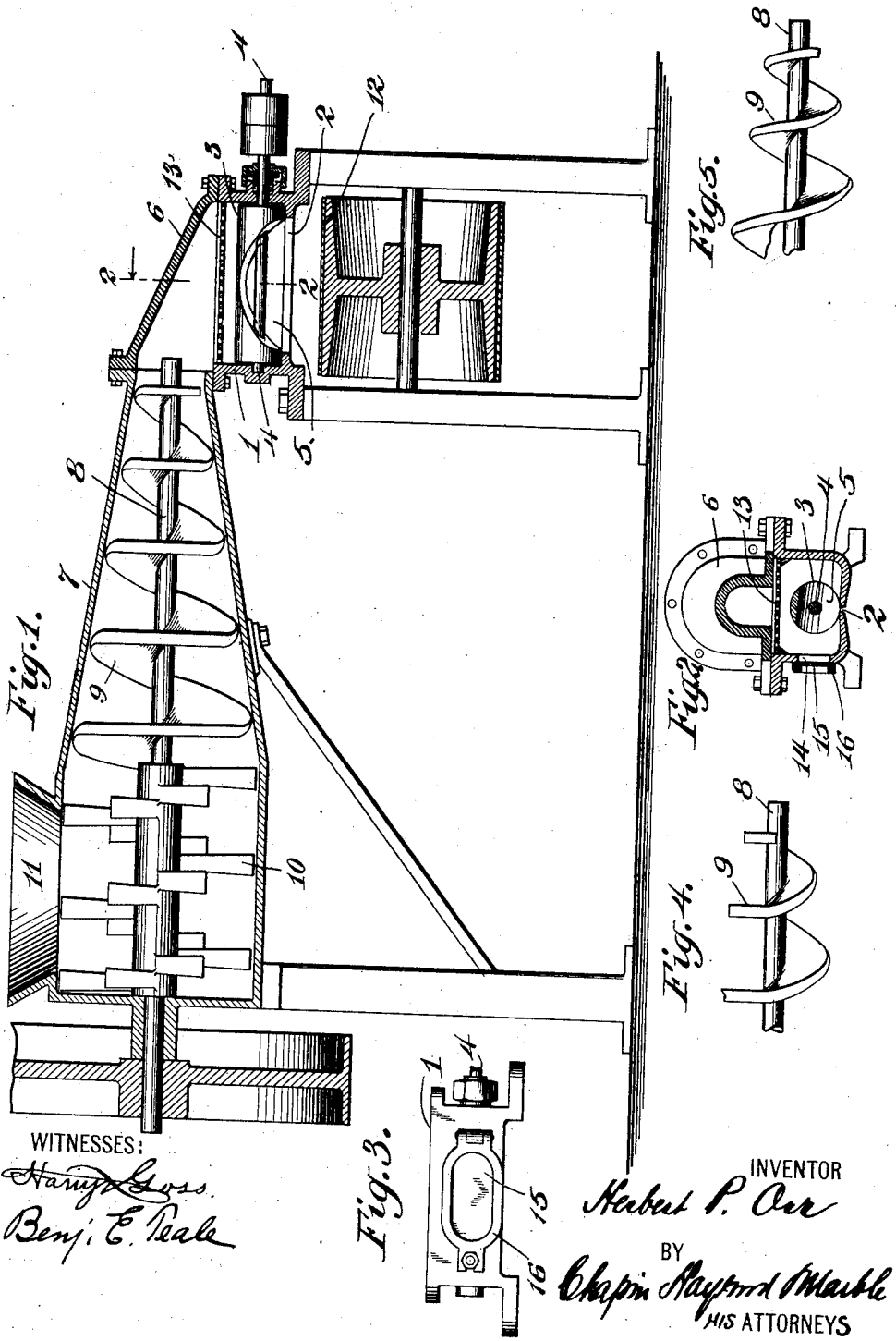
WITNESSES:
INVENTOR
BY
HIS ATTORNEYS

UNITED STATES PATENT OFFICE.

HERBERT P. ORR, OF MEXICO, MEXICO, ASSIGNOR TO VICTOR M. BRASCHI, OF MEXICO, MEXICO.

APPARATUS FOR FORMING ARTICLES OF PLASTIC MATERIAL.

No. 826,442.     Specification of Letters Patent.     Patented July 17, 1906.

Application filed March 28, 1905. Serial No. 252,452.

*To all whom it may concern:*

Be it known that I, HERBERT P. ORR, a subject of the King of Great Britain, and a resident of Mexico city, Mexico, have invented certain new and useful Improvements in Apparatus for Forming Articles of Plastic Material, of which the following is a specification, reference being had to the accompanying drawings, forming a part thereof.

My invention relates to improvements in apparatus for forming articles of plastic material, and particularly to improvements in apparatus for forming and producing certain articles of food, such as tortillas.

The tortilla is a staple article of food in Mexico, and is practically a griddle-cake, usually from five to six inches in diameter and from one-sixteenth to one-eighth of an inch in thickness, and is composed of ground corn or maize. Indian corn or maize is usually soaked in hot water with lime until the grain and the hull are softened, and the mass is then ground together to form a dough. This dough is suitably prepared into cakes of the proper size and shape and is then cooked.

It is the object of the present invention to simply, quickly, and economically form the dough into the cakes so as to prepare them for the cooking process.

The cakes formed by this machine will be conveyed away in a suitable manner to be cooked and are then ready for consumption.

My improved machine comprises generally a casing having a slot or opening therein and a revoluble member mounted in the casing adjacent this slot or opening, the revoluble member being of substantially cylindrical form and having a portion of its periphery cut away, whereby in its revolution it will so vary the extent of opening through the casing-slot as to properly form or shape material forced therethrough to form the articles required. I provide means for forcing the material through the slot or opening, said means comprising a conveyer-tube having a receiving-opening, a shaft in said conveyer-tube carrying paddle-blades beneath said opening, and a conveyer-screw extending from the paddle-blades to the casing. Material fed into the receiving-opening will be properly stirred and broken up by the paddle-blades and will be fed forward through the conveyer-tube by the conveyer-screw to the casing, being forced thence through the slot or opening therein and formed in its passage through the slot by the revoluble forming member. A machine of this description is rapid and positive in its action, simple and inexpensive to manufacture, and extremely unlikely to get out of order.

My invention further consists in certain novel details of construction and combination of parts such as will be hereinafter more fully set forth.

In order that my invention may be fully understood, I will now proceed to describe an embodiment thereof with reference to the accompanying drawings, and will then point out the novel features in claims.

In the drawings, Figure 1 is a view in central vertical section through an apparatus embodying my invention. Fig. 2 is a view in transverse vertical section through a portion thereof, the plane of section being substantially upon the line 2 2 of Fig. 1. Fig. 3 is a view in side elevation of the casing, showing particularly the cleaning-door and elastic diaphragm. Fig. 4 is a detail view of a portion of the conveyer-screw employed, and Fig. 5 is a view of a modified form of conveyer-screw.

The machine comprises a casing 1, in which is arranged a longitudinal slot 2, of a width substantially equivalent to the thickness of the article to be produced and a length about equal to the diameter thereof. Adjacent this slot is arranged a cylindrical forming member 3, secured to a shaft 4, revolubly mounted in the casing 1. The periphery of the member 3 is arranged to substantially engage the edges of the walls of the slot 2, and the said member has a cut-away portion 5, whereby in its revolution it will vary the size of opening permitted through the slot 2. Above the casing 1 is a hood 6, to which is connected a conveyer-tube 7.

Rotatably mounted in the conveyer-tube is a revoluble shaft 8, upon which is arranged a conveyer-screw 9 and paddle-blades 10. The paddle-blades are arranged upon a portion of the shaft beneath the receiving-opening 11 in the said conveyer-tube, whereby material fed into the conveyer-tube through the receiving-opening 11 will be first attacked by the paddle-blades, by which it is cut up and fed to the conveyer-screw 9, the conveyer-screw feeding the material through the tube 7 to the hood 6, and thence to the casing 1 and out through the slot 2. The conveyer-screw 9 comprises helical portions alternating with plane portions arranged transversely at right angles to the axis thereof, said helical and plane portions connected together to form a continuous screw. As shown in Fig. 1 and detail Fig. 4, these alternating portions continue around the shaft of the screw each for about one-half of a revolution and succeed each other at each half a revolution from one end of the screw to the other. If desired, the ordinary form of helical screw may be employed, such as is shown in Fig. 5; but the specific form described above is preferred. The revoluble member, operating in conjunction with the slot, will properly form the dough into the required shape, the articles thus formed falling upon a conveyer 12, traveling beneath the slot, by which they may be conveyed to any suitable point. Preferably a colander or sieve 13 is arranged in the casing 1, so that the plastic material is strained as it passes from the conveyer to the casing.

The casing 1 is provided with a lateral opening or doorway 14, through which access may be had to the interior thereof when desired. An elastic diaphragm 15, preferably composed of rubber, is arranged to cover the said opening, a door-frame 16 clamping the diaphragm in position. The diaphragm is provided for the purpose of taking up any excess of pressure, such as might occur at the moment the slot or opening 2 is entirely closed by the forming member, and the doorway 14 is found extremely convenient for the purpose of cleaning out the interior of the casing 1.

It will of course be apparent that a device constructed in accordance with my invention is capable of producing other articles than those above named.

What I claim is—

1. In a machine of the class described, the combination with a casing having an opening therein, of a cylindrical forming member mounted in said casing to revolve adjacent said opening, said member having a peripheral portion cut away proportionate to the size and shape of the object to be formed.

2. In a machine of the class described, the combination with a casing having a slot therein, of a cylindrical forming member mounted in said casing longitudinally with respect to said slot, and axially in a line substantially parallel therewith, the periphery of said forming member substantially engaging the walls of said slot, said forming member having a portion of its periphery cut away, whereby, in its revolution, it will vary the extent of opening through said slot.

3. In a machine of the character described, the combination with a casing having a longitudinal slot therein and means for forcing plastic material therethrough, of a revoluble forming member mounted in said casing adjacent said slot, arranged in its revolution to vary the extent of opening through said slot.

4. In a machine of the character described, the combination with a casing having a longitudinal slot therein, and means for forcing plastic material through said slot, of a cylindrical forming member mounted in said casing with its periphery substantially in engagement with the walls of said slot, said cylinder having a transverse cut-away portion, the form of which at the periphery is substantially equivalent to a circle wrapped around the peripheral surface of the cylinder, whereby, in its revolution, the extent of opening through said slot will be varied to form articles of substantially cylindrical contour as the plastic material is forced through said slot.

5. In a machine of the character described, the combination with a chamber or casing having an opening therein and forming mechanism adjacent said opening, of means for forcing plastic material through said opening comprising a conveyer-tube having a receiving-opening, a shaft in said tube, paddle-blades upon said shaft beneath said receiving-opening, and a conveyer-screw upon said shaft between said paddle-blades and said casing, said screw having helical portions alternating with plane portions arranged transversely at right angles to the axis thereof, said helical and plane portions connected together to form a continuous screw.

6. In a machine of the character described, the combination with a chamber or casing having an opening therein and forming mechanism adjacent said opening, of means for forcing plastic material through said opening comprising a conveyer-tube and a screw therein, said screw having helical portions alternating with plane portions arranged transversely at right angles to the axis thereof, said helical and plane portions connected together to form a continuous screw, substantially as specified.

7. In a machine of the character described, the combination with a casing having a slot or opening, and a forming member arranged adjacent thereto, said casing having a lateral doorway or opening, of a movable door for said doorway, said door including an elastic diaphragm, substantially as specified.

HERBERT P. ORR.

Witnesses:
GRAHAM M. KER,
GEO. H. BEDWELL.